April 30, 1946.  E. BLETZ  2,399,423

HEATING APPARATUS

Filed Aug. 14, 1941　　2 Sheets-Sheet 1

WITNESSES:

INVENTOR
Edward Bletz
BY
ATTORNEY

April 30, 1946.　　　　E. BLETZ　　　　2,399,423
HEATING APPARATUS
Filed Aug. 14, 1941　　　　2 Sheets-Sheet 2

WITNESSES:
Roy K. Ennall
E. H. Lutz

INVENTOR
EDWARD BLETZ
BY
ATTORNEY

Patented Apr. 30, 1946

2,399,423

UNITED STATES PATENT OFFICE 2,399,423

HEATING APPARATUS

Edward Bletz, Lexington, Ohio, assignor to Westinghouse Electric Corporation, East Pittsburgh, Pa., a corporation of Pennsylvania Application August 14, 1941, Serial No. 406,781

6 Claims. (Cl. 219—20)

This invention relates to electric heating devices and more particularly to that type having a heating unit provided with a control for regulating the heat output of the unit, and it has for an object to provide an improved device of the character set forth.

In the art of cooking, many foods require a fast or rapid initial heating to bring the food to a predetermined temperature, such as the boiling point of water in the case of foods cooked in water, and then require less heat after that temperature has been reached. If too much heat is applied to the food after it has reached such predetermined temperature, not only is the food cooked improperly but a substantial amount of heat is wasted. There is, therefore, a definite need for a heating unit which will bring the food to a predetermined temperature in a relatively short time and then supply only sufficient heat to the food to maintain it at that temperature without the necessity of manual adjustment of the heating unit.

It is, accordingly, a further object of this invention to provide an improved control system for a heating unit which may comprise a single electric heating element, which control system permits the heating element to operate at full wattage input until the temperature of the food to be cooked or the material to be heated thereon reaches a predetermined value and then automatically reduces the wattage input to the heating element to any desired value, as determined by the adjustment of the control system, to maintain the food at the proper temperature.

These and other objects are effected by my invention as will be apparent from the following description and claims taken in accordance with the accompanying drawings, forming a part of this application, in which:

Figure 1:
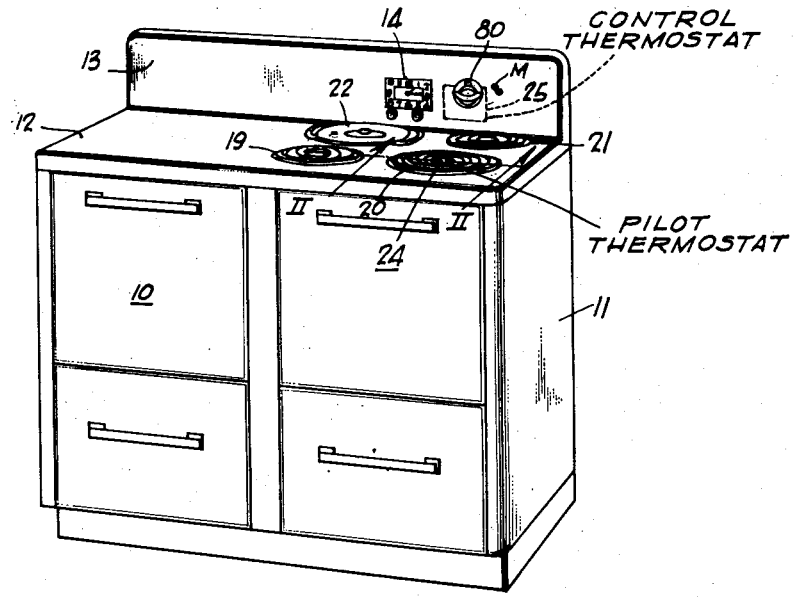
Fig. 1 is a perspective view of an electric cooking range in which the present invention has been incorporated.

Referring to the drawings and particularly to Fig. 1, there has been illustrated an electric cooking range designated generally by the reference character 10. This range has been illustrated to show one adaptation of the invention, it being apparent that the present invention is not limited to application to the particular range shown. The range 10 comprises a range body 11 having the usual oven and broiler compartments (not shown), closed by suitable doors, and a platform 12 and back splasher 13. The operation of the oven may be regulated in the usual manner by means of a time clock 14 which controls circuits for the oven heating elements (not shown) to start and stop the baking or cooking operations at different times depending on the setting of the clock controls.

In the particular range illustrated in the drawings, three range surface units designated 19, 20, and 21 and a deep well cooker 22 have been shown supported in the platform 12. However, the present invention is not concerned with the details of the range construction or the accessories therefor and for a clear understanding of the present invention specific reference will only be made hereafter to the surface unit 20. It will be understood that the operation of the surface units 19 and 21, as well as the deep well cooker unit 22, may also be controlled in the manner to be described in connection with the surface unit 20.

Figure 2:
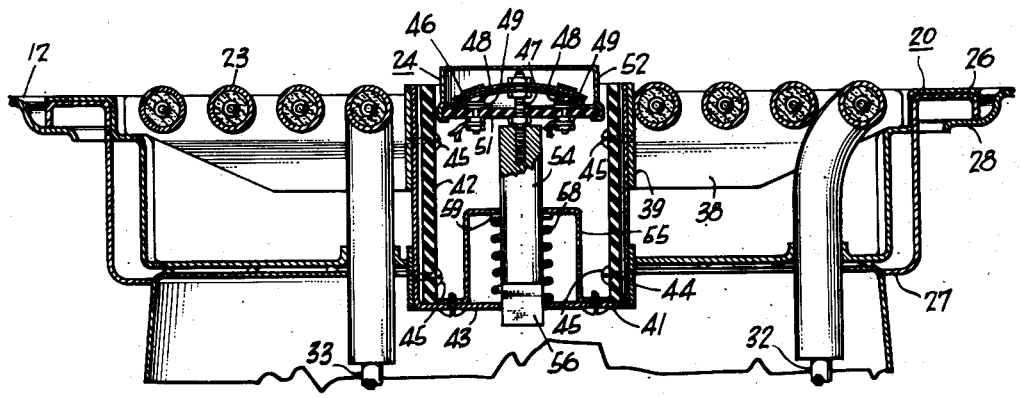
Fig. 2 is a vertical section through one of the surface units of the range illustrated in Fig. 1, the section being taken substantially on the line II—II of Fig. 1.
Figure 3:
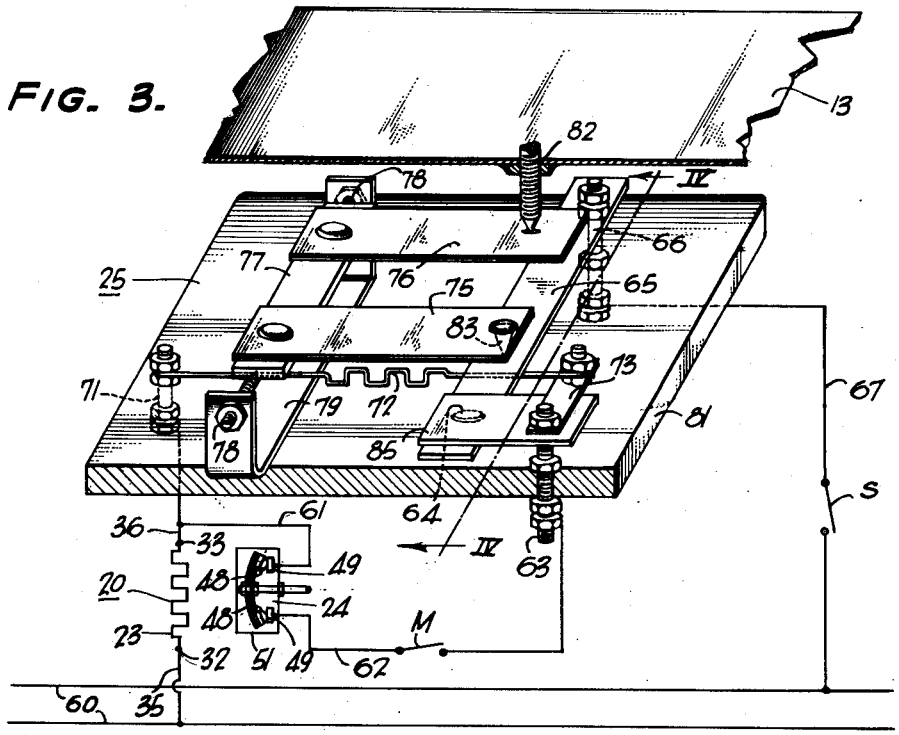
Fig. 3 is a diagram of the electrical circuit employed for the surface unit illustrated in Fig. 2, one of two thermostats employed being shown in section and the other thermostat being shown in perspective.

The control system for the surface unit 20 includes a pilot thermostat 24, Fig. 2, thermally insulated from heating element 23 of the surface unit 20 and supported in a position to be heated by a cooking vessel placed on the surface unit. The control system also includes a control thermostat 25 which is preferably thermally insulated from the cooking vessel and the heating element 23. The control thermostat may conveniently be mounted at the rear of the back splasher as shown in Figs. 1 and 3. These two thermostats control electrical circuits for the heating element of the surface unit in such a way that the heating element receives full wattage input until the cooking vessel reaches a temperature determined by the pilot thermostat 24 and thereafter the average wattage input to the heating element may be decreased to any desired value depending on the adjustment of the control thermostat 25.

To obtain fully automatic control of the surface unit 20, the circuits for the heating element 23 may be controlled by means of the time clock 14 which also controls the oven heating elements (not shown), to close and open these circuits at given times as determined by the setting of the clock controls. This clock may be of any approved construction, and since the details thereof and the manner in which it may open and close a switch S in the heating element circuits (Fig. 3) are well known, they need not be further described.

Referring to Fig. 2, it will be noted that the range surface unit 20 is supported within an opening formed in the range platform 12 as by means of an overhanging annular flange 26, formed on the reflector-pan structure 27 of the unit. This flange rests on a complementary annular flange 28 of the range platform.

The reflector pan structure 27 supports the flat, helically-coiled armored resistance heating element 23 having terminals 32 and 33. Leads 35 and 36, Fig. 3, extending from the terminals 32 and 33 are connected in circuits illustrated diagrammatically in Fig. 3. The armored resistance element 23 may be supported by spider arms 38 in the usual manner, the inner ends of these arms being welded to a ring 39.

The ring 39 has welded thereto the upper ends of a U-shaped metal strap 41 which supports the pilot thermostat 24 in spaced concentric relation to the heating element 23. A sleeve 42 of heat insulating material rests on the cross bar 43 of the U-shaped strap 41 and is secured to the ring 39 and a similar ring 44, carried by the strap 41, by means of screws 45. The insulating sleeve 42 surrounds the thermostat 24 and thermally insulates the thermostat from the heating element 23 and its supporting structure.

The temperature responsive portion of the pilot thermostat 24 may be of conventional construction and is here shown as comprising a bimetal disc 46 of the snap-acting type. This disc is supported at its center by an adjusting screw 47, and carries contacts 48 which are preferably insulated from the disc but are connected to each other by means of a suitable conductor. When the temperature of the disc is below its critical or operating temperature, it is in the position shown in Fig. 2 and the contacts 48 bridge fixed contacts 49 carried by a base plate 51 mounted on the thermostat adjusting screw 47. It will be understood that the disc 46 may be adjusted to snap over at different temperatures by means of the screw 47.

The bimetal disc 46 is enclosed by a cap 52 which is preferably made of good heat-conducting material such as aluminum or the like. The rim of this cup is flanged in the manner shown in Fig. 2 so that it may be detachably secured to the base plate 51.

The adjusting screw 47 of the thermostat 24 is threaded into a vertically extending rod 54. This rod extends slidably through an opening formed in an inverted U-shaped guide bracket 55 which is secured to the cross bar 43 of the strap 41. This cross bar is slotted to receive the flattened end 56 of the rod 54 whereby the rod 54 and the thermostat structure carried thereby are free to move vertically but are prevented from rotating. The rod 54 is biased upwardly by means of a coil spring 58 which encircles the rod between the cross bar 43 and a pin 59 extending through the rod.

As shown in Fig. 2, the top of the thermostat 24 is normally positioned above the plane of the cooking surface of the heating element 23, but the spring 58 permits the thermostat to be moved downwardly by a cooking vessel placed on the surface unit 20. Thus, good thermal contact between the vessel and the thermostat is assured.

With reference to Fig. 3, it will be noted that the heating element 23 is connected in a circuit across the power conductors 60 when the thermostat 24 is closed. This circuit may be traced from one of the conductors 60, lead 35 to the terminal 32 of the heating element 23, through the heating element, terminal 33 thereof, lead 36, conductor 61, through the closed contacts of the thermostat 24, conductor 62, terminal screw 63, closed contacts 64 of the control thermostat 25, to be described in detail hereinafter, spring 65 of the control thermostat, terminal screw 66, conductor 67 to the other power conductor 60. Thus, as long as the thermostat 24 remains closed, the surface unit 20 will receive full wattage input and will be on "high" heat. The thermostat 24 is preferably adjusted, at the factory, to "open" and interrupt the circuit described above when its temperature is approximately that of boiling water although it is to be understood that this thermostat may be adjusted to "open" at any desired temperature.

Since the thermostat 24 is in close thermal relation with the cooking vessel but is thermally insulated from the heating element 23, the thermostat will receive its heat chiefly from the vessel and will operate in response to the temperature of the cooking vessel. Thus, when it is desired to reduce the amount of heat supplied to the vessel as when the contents thereof have been brought to or near the boiling point of water it is necessary to open the circuit described above. With the thermostat 24 open, the circuit described above will be interrupted and normally permit the heating element to cool. However, when the thermostat 24 opens, a second circuit for the heating element 23 is completed.

This second circuit extends from one power conductor 60 through the lead 35, terminal 32, heating unit 23, terminal 33, lead 36 to terminal screw 71, radiant heater 72, strap conductor 73 to the terminal screw 63, closed contacts 64, spring 65, terminal screw 66, and conductor 67 to the other power conductor 60.

The radiant heater 72 is shunted by the circuit branch which includes the thermostat 24, when contacts 48 and 49 are closed. This heater is arranged so that when energized its heat directly affects a bimetal strip 75 of the control thermostat 25. The control thermostat comprises the mentioned bimetal strip 75 and an identical bimetal strip 76. The bimetal strip 76 compensates for ambient temperatures which might otherwise effect the calibration of the bimetal strip 75. Each bimetal strip is fixed at one end to a transverse bar 77. This bar is free to pivot about its longitudinal axis, being supported by means of pointed pivot screws 78 received in sockets formed in the ends of the bar 77. These pivot screws are adjustably secured in the upstanding ends of a U-shaped bracket 79 (Figs. 3 and 4) carried by a mounting panel 81 preferably made of insulating material. This panel is mounted rearwardly of the back splasher of the range 10 as shown in Fig. 3 and also supports the terminal screws 63, 66 and 71 which have been referred to above.

An adjusting screw 82 is threaded through the back splasher 13 in a position to have its inner or lower end engage the free end of the ambient temperature compensating bimetal strip 76. The outer end of this screw is provided with an adjusting knob 80 as shown in Fig. 1. This knob may be provided with a suitable scale adapted to be read with an index on the front surface of the back splasher for indicating the adjusted position of the control thermostat. This scale may be calibrated in any desired units such as degrees of temperature.

Figure 4:
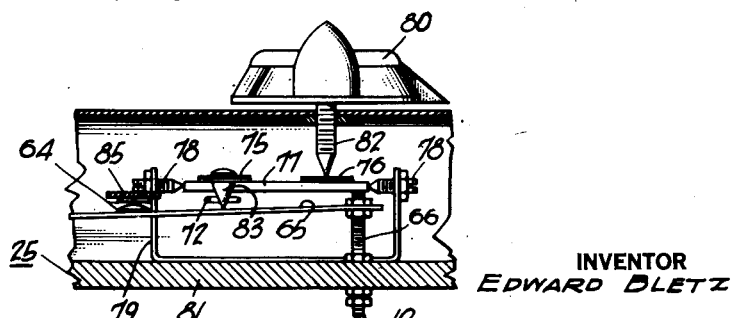
Fig. 4 is a sectional view taken substantially on the line IV—IV of Fig. 3, and showing the parts in the position they assume when the thermostat has opened the heater circuit.

The free end of the bimetal strip 75 is provided on its underside with a pin 83 riveted thereto but preferably electrically insulated therefrom. This pin is adapted to rest on the upper surface of the spring member 65. The spring member 65 is adjustably supported at one of its ends on the terminal screw 66 as shown in Fig. 4 while the free end of the spring carries, on its upper surface, one of the contact buttons 64 in a position to engage the other contact button 64 carried on conductor strap 85. The conductor strap 85 is adjustably secured to the terminal screw 63.

The bimetal strips 75 and 76 are so arranged that upon the application of heat thereto, their free ends will curve downwardly as viewed in Figs. 3 and 4. When the pilot thermostat 24 opens and the circuit for energizing the heating element 23 and the radiant heater 72 is effective, the heat from this radiant heater will affect the bimetal element 75 only and cause this strip to bow downwardly as viewed in Fig. 4. As this bimetal strip bows downwardly the pin 83 carried thereby will press on the spring member 65, when the bimetal strip 76 engages the adjusting screw 82, and move the lower contact button 64 clear of the fixed contact button 64 to open the heater circuit. This circuit remains open until the bimetal strip 75 cools sufficiently to allow the contacts 64 to close. The length of the "on" and "off" cycles of the control thermostat switch 25 is regulated by turning the adjusting knob 82 in one direction or the other.

Referring to Figs. 3 and 4, it will be apparent that by turning the adjusting screw down, as viewed in these figures, to bring the pointed end of the adjusting screw 82 closer to the spring arm 65, less movement of the bimetal strip 75 and consequently less heat from the radiant heater 72 will be required to open the contacts 64 and interrupt the heater circuit. Thus, when but little heat from the radiant heater 72 is required to move the bimetal strip 75 a sufficient distance to open the contacts 64, the "on" period of the heater circuit will be relatively short and the "off" period will be relatively long. This cycling of the thermostat provides a definite wattage input, over a given period of time, to the surface unit which input may be varied by adjusting the position of the screw 82.

Thus, when the adjusting screw is raised relative to the spring arm 65 a greater movement of the bimetal strip 75 and consequently a greater amount of heat from the radiant heater 72 will be required to open the contacts 64 to interrupt the heater circuit.

The adjusting screw may be raised, relative to the spring arm 65, an amount greater than the maximum movement of the bimetal strip 75 to provide a continuous "on" period in which case the surface unit will receive full wattage input as long as the screw remains in its raised or "high" position. The adjusting screw 82 may also be turned down so as to maintain the contacts 64 continuously open when it is desired to turn the heater circuit "off."

From the above description it will be understood that any desired wattage input to the surface unit may be obtained by adjusting the screw 82 between its "high" and its "off" positions. Thus, if the control thermostat 25 be adjusted to provide "on" and "off" periods of equal duration over a given period of time the surface unit will be energized one-half of the time, or in other words, will receive one-half of its normal wattage input during that time. The wattage input to the surface unit determines the amount of heat supplied to the cooking vessel.

While the "on" and "off" cycle of the control thermostat 25 may be of any desired duration, it has been found that good cooking results are obtained when the cycle is completed in not much greater than one minute to prevent the heating element 23 from cooling too much during the "off" period of the thermostat. In tests using a heating unit of 1500 watts and a control thermostat adjusted to provide $\frac{1}{16}$ heat, that is, over a given length of time the unit was energized $\frac{1}{16}$ of the time, it was found that a cycle of the thermostat with 2 seconds "on" and 30 seconds "off" gave very satisfactory results. With the control thermostat adjusted to give ¾ heat, or in other words, so that the heating element was energized ¾ of the time, the thermostat was "on" for 45 seconds to energize the heating element for this period and "off" for 15 seconds.

As mentioned above the cooking operation of the surface unit may be controlled by means of the time clock 14. As shown diagrammatically in Fig. 3, this clock would operate a switch S to close this switch at a given time and then open this switch at a subsequent time. With this arrangement the cooking operation may be started at any predetermined time and stopped at any subsequent time.

In the event it is desired to utilize less than full wattage input to the surface unit at the beginning of a cooking operation, the manual switch M may be provided in the conductor 60 (Fig. 3) which will allow the pilot thermostat circuit to be opened at will.

Figure 5:
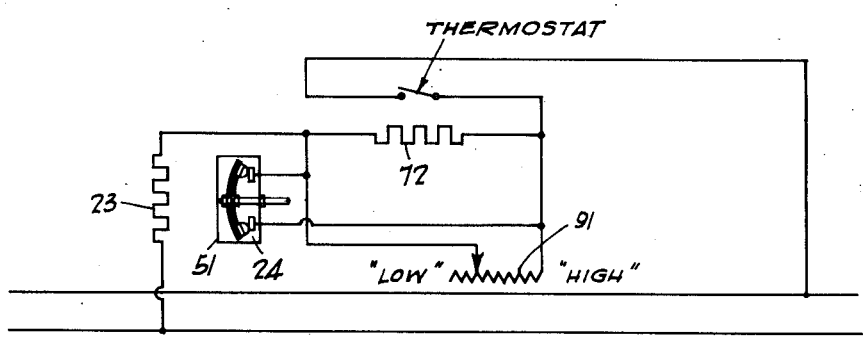
Fig. 5 is a circuit diagram illustrating a modified form of the invention.

In Fig. 5 there has been shown a slightly modified form of the invention. In this figure the wiring diagram illustrated in Fig. 3 has been shown more or less schematically with an alternative manner of adjusting the operation of the control thermostat incorporated therein. The elements shown in Fig. 5 which correspond to similar elements in Fig. 3 have been identified with the same reference characters. The only substantial difference between Fig. 5 and Fig. 3 is that the control thermostat 25 may be of the permanently adjusted type in that the screw 82 may be omitted if desired and a fixed pin provided in place thereof. In this form of the invention, adjustment of the "on" and "off" periods of the thermostat is obtained by means of a variable resistor 91 which is adapted to by-pass more or less current around the radiant heater 72. Thus, when the variable resistor is set at "high" to cut out all of the resistor practically all of the electricity is by-passed or shunted around the radiant heater and the control thermostat will not be heated by the radiant heater with the result that the circuit for the heater element 23 remains closed and the heater element receives full wattage input. With the variable resistor 91 set at "low," that is, with the entire resistance of the by-pass in the circuit substantially all of the current will pass through the radiant heater 72 with the result that the bimetal element 75 of the control thermostat will be rapidly heated to provide a relatively short "on" period for the heater element circuit and a relative long "off" period. It will be understood that the variable resistor 91 may be adjusted to any position between the "high" and "low" settings referred to above to provide various cycles of "on" and "off" periods.

The variable resistor is adapted to be adjusted by means of a knob or the like mounted on the front of the back splasher in a manner similar to the knob 83 shown in Fig. 1.

Figures 6, 7:
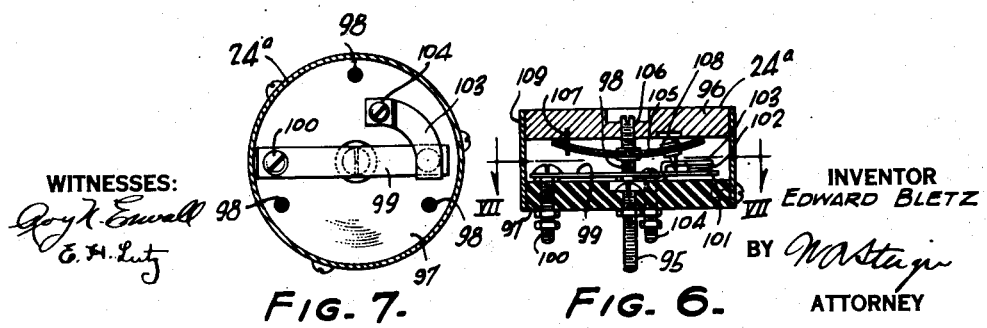
Fig. 6 is a vertical section of a modified thermostat which may be substituted for the thermostat shown in Fig. 2.
Fig. 7 is a horizontal sectional view taken on the line VII—VII of Fig. 6.

In Figs. 6 and 7 there is illustrated a slightly modified pilot thermostat 24a which may be used in place of the thermostat 24. This thermostat is provided with a depending screw 95 which is adapted to be received in the upper end of the vertical rod 54 (Fig 2), for supporting the thermostat in a position to resiliently engage the bottom of a cooking vessel or the like placed on the surface unit 20.

The thermostat 24a comprises a metal disc 96 secured in spaced relation to a disc 97 of insulating material by means of spaced studs 98. The lower insulating disc 97 carries a spring arm 99 which is secured at one end to the disc by means of a terminal screw 100. The free end of this arm carries a contact button 101 and is normally biased upwardly so that this contact engages a contact 102 carried by a fixed arm 103. The arm 103 is secured to the disc 97 by means of a terminal screw 104. It will be understood that the terminal screws 100 and 104 are adapted to be connected to the conductors 61 and 62 (Fig. 3) when this thermostat is to be used in place of the thermostat 24.

A bimetal disc 105 is carried by an adjusting screw 106 threaded into the upper metallic disc 96, the head of this screw being accessible at the upper surface of the disc 96 as shown in Fig. 6 to allow adjustment of the bimetal disc 105. The bimetal disc is preferably snap-acting and is fixed against rotation by means of a pin 107 carried by the disc 96 which pin is loosely received in a suitable opening provided in the disc. A pin 108 fixed to, but electrically insulated from, the bimetal disc 105 is adapted to strike the spring arm 99 to open contacts 101 and 102 when the bimetal disc snaps over from the position shown in Fig. 6. It will be understood that the bimetal disc assumes the position shown in Fig. 6 when it is below its critical or set temperature and will be curved in a reverse direction with relation to its center when the thermostat reaches its set temperature so that the pin 108 will hold the contacts 102 and 103 open to interrupt the circuit normally completed by these contacts.

As shown in Fig. 6, the undersurface of the metal disc 96 may be provided with a recess overlying the pin 108 to provide clearance for the head of this pin. In order to prevent the thermostat from being heated directly by the heat element 23 it is preferred to enclose the thermostat by means of a sleeve 109 which may be made of heat insulating material and secured to the discs 96 and 97 in any suitable manner as by means of screws or turned-over flanges like that shown on the cup 52 in Fig. 2.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A control system operatively associated with and adapted to control a heating unit including an electrical resistance element adapted to supply heat to a cooking vessel or the like, said control system comprising an energizing circuit for said resistance element, a thermostatic switch, a variable resistor, and a heater element, said thermostatic switch, variable resistor and heater element being arranged in multiple relative to each other and in series with said resistance element in said circuit, whereby said thermostatic switch, when closed, shunts said heater element and variable resistor, said thermostatic switch being responsive to the temperature of said cooking vessel and adapted to open when said vessel reaches a predetermined temperature, and a heat-actuated switch in said circuit in series with said electrical resistance element, said heat-actuated switch being arranged to be heated by said heater element and actuated thereby to intermittently interrupt said circuit, said variable resistor being adapted to vary the heat supplied by said heater element to said heat-actuated switch to vary the duration of the interruptions of said circuit by said heat-actuated switch.

2. A control system operatively associated with and adapted to control a range surface unit including an annular electric resistance element for supplying heat to a cooking vessel or the like, said control system comprising a thermostatic switch supported in substantially concentric relation with said resistance element in a position to be heated by said cooking vessel or the like, baffle means for thermally insulating said thermostatic switch from said resistance element, a heat-actuated switch thermally insulated from said cooking vessel or the like and said resistance element, an energizing circuit for said resistance element controlled by said switches, an auxiliary resistance element in said circuit arranged in multiple with said thermostatic switch and arranged to supply heat to said heat-actuated switch for operating the same to intermittently open said circuit, said first-mentioned electric resistance element being continuously energized when said thermostatic switch is closed, said first-mentioned electric resistance element being intermittently energized by said heat-actuated switch when said first-mentioned thermostatic switch is open, said heat-actuated switch being adjustable to vary the energy input to said first-mentioned electric resistance element when said circuit is under the control of said heat-actuated switch.

3. A control system operatively associated with and adapted to control a heating unit including an electrical resistance element adapted to supply heat to a cooking vessel or the like, said control system comprising an energizing circuit for said resistance element, circuit-interrupting means in said circuit in series with said resistance element, said circuit-interrupting means being adapted intermittently to establish and to interrupt said energizing circuit for said resistance element and being adjustable to vary the ratio between the period that the circuit is established and the period that it is interrupted, and temperature-responsive means for shunting at least a part of said circuit-interrupting means to provide continuous energization of said resistance element in response to vessel temperature below a predetermined minimum.

4. A control system as set forth in claim 3 wherein said circuit-interrupting means comprises a switch in said circuit and electrically-energized means for intermittently opening said switch, and wherein said temperature-responsive means shunts said electrically-energized means to provide continuous closing of said switch and continuous energization of said resistance element.

5. The combination set forth in claim 3 wherein said circuit-interrupting means includes an auxiliary resistance heating element, and a temperature-responsive switch subjected to and opened by the heat of said auxiliary resistance heating element, and wherein said temperature-responsive means shorts out said auxiliary heating element in response to said predetermined minimum temperature of said vessel.

6. The combination with a surface heating unit adapted to support a cooking vessel placed thereon and to supply heat to such cooking vessel, of a control system for said heating unit, said control system comprising circuit-interrupting means including a switch connected in series with said heating unit and means for intermittently opening and closing said switch, a manually-adjustable member, means responsive to one position of said member for effecting continuous energization of the heating unit, means responsive to a second position of said member for effecting continuous deenergization of said heating unit, said manually-adjustable member being adapted, in various positions other than said first and second positions, to adjust said circuit-interrupting means to vary the ratio between the period that the circuit is established and the period that it is interrupted and thereby to vary the average wattage supplied to said heating unit, and temperature-responsive means including a temperature-responsive element disposed centrally of said heating unit and adapted to contact the bottom of a vessel placed on the heating unit, said temperature-responsive means further including a switch which, when closed, effects continuous energization of the heating unit, said temperature-responsive element operating said switch to close the same when the vessel is below a predetermined temperature, whereby the heating unit is continuously energized, and to open the switch when the vessel is above the predetermined temperature, whereupon the energization of the heating unit is controlled by the manually-adjustable member.

EDWARD BLETZ.